(12) United States Patent
Shatsky et al.

(10) Patent No.: US 11,416,396 B2
(45) Date of Patent: Aug. 16, 2022

(54) VOLUME TIERING IN STORAGE SYSTEMS

(71) Applicant: EMC IP Holding Company LLC, Hopkinton, MA (US)

(72) Inventors: Yosef Shatsky, Karnei Shomron (IL); Rivka Matosevich, Zichron Ya'acov (IL); Doron Tal, Haifa (IL)

(73) Assignee: EMC IP Holding Company LLC, Hopkinton, MA (US)

(*) Notice: Subject to any disclaimer, the term of this patent is extended or adjusted under 35 U.S.C. 154(b) by 21 days.

(21) Appl. No.: 17/077,105

(22) Filed: Oct. 22, 2020

(65) Prior Publication Data
US 2022/0129380 A1 Apr. 28, 2022

(51) Int. Cl.
*G06F 12/08* (2016.01)
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/067* (2013.01); *G06F 3/0644* (2013.01); *G06F 2212/60* (2013.01)

(58) Field of Classification Search
CPC .. G06F 12/0802; G06F 3/0604; G06F 3/0644; G06F 3/067; G06F 2212/60
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |

(Continued)

FOREIGN PATENT DOCUMENTS

WO PCT/US2019/024885 1/2020
WO PCT/US2019/024900 1/2020

OTHER PUBLICATIONS

Dell EMC, "Dell EMC VxRack Flex," Dell EMC Product Overview, 2018, 5 pages.

(Continued)

*Primary Examiner* — Ryan Bertram
(74) *Attorney, Agent, or Firm* — Ryan, Mason & Lewis, LLP

(57) ABSTRACT

An apparatus comprises a processing device configured to receive a request to create a given storage volume in a storage system, the storage system providing a plurality of storage features. The processing device is also configured to select, for the given storage volume, one of a set of one or more volume tiers, each of the volume tiers specifying whether respective ones of the plurality of storage features provided by the storage system are enabled or disabled for storage volumes associated with that volume tier. The processing device is further configured to create the given storage volume in the storage system, and to associate the selected volume tier with the given storage volume, wherein associating the selected volume tier with the given storage volume comprises enabling or disabling respective ones of the plurality of storage features provided by the storage system as specified by the selected volume tier.

20 Claims, 5 Drawing Sheets

200

| FEATURE/VOLUME TIER | DIRECT | BALANCED | FULLY FEATURED |
|---|---|---|---|
| COMPUTE BALANCING | X | √ | √ |
| WRITE CACHE | X | √ | √ |
| SPACE EFFICIENT SNAPSHOTS AND COPIES | X | X | √ |
| THIN PROVISIONING | X | X | √ |
| DATA REDUCTION | X | X | √ |
| RESILIENCY / RAID | √ | √ | √ |

(56) References Cited

U.S. PATENT DOCUMENTS

| | | | |
|---|---|---|---|
| 7,945,640 B1* | 5/2011 | VanTine | G06F 3/067 709/217 |
| 8,843,676 B2 | 9/2014 | Rajamanickam et al. | |
| 8,909,829 B1* | 12/2014 | Thangapalam | G06F 3/0604 710/62 |
| 9,372,751 B2 | 6/2016 | McNutt | |
| 9,514,014 B2 | 12/2016 | Webman et al. | |
| 9,892,045 B1 | 2/2018 | Douglis et al. | |
| 10,078,598 B1 | 9/2018 | Wallace et al. | |
| 10,331,561 B1 | 6/2019 | Shilane et al. | |
| 10,353,634 B1* | 7/2019 | Greenwood | G06F 3/0619 |
| 10,445,180 B2 | 10/2019 | Butterworth et al. | |
| 10,599,354 B1* | 3/2020 | Greenwood | G06F 3/067 |
| 2002/0032835 A1 | 3/2002 | Li et al. | |
| 2003/0061399 A1* | 3/2003 | Wagener | G06F 3/0601 719/321 |
| 2005/0055370 A1* | 3/2005 | Fukuda | G06F 3/061 |
| 2008/0021853 A1 | 1/2008 | Modha et al. | |
| 2008/0028143 A1* | 1/2008 | Murase | G06F 3/0665 711/114 |
| 2008/0126734 A1* | 5/2008 | Murase | G06F 3/0665 711/170 |
| 2008/0270696 A1* | 10/2008 | Murayama | G06F 3/067 711/114 |
| 2008/0301763 A1* | 12/2008 | Sasaki | G06F 11/3485 726/1 |
| 2009/0198949 A1* | 8/2009 | Kuligowski | G06F 3/065 711/203 |
| 2009/0204761 A1 | 8/2009 | Caprioli et al. | |
| 2009/0276593 A1 | 11/2009 | Jacobson et al. | |
| 2013/0036266 A1* | 2/2013 | Naganuma | G06F 3/0653 711/114 |
| 2013/0073702 A1* | 3/2013 | Umbehocker | G06F 3/067 709/222 |
| 2013/0305002 A1 | 11/2013 | Hallak et al. | |
| 2014/0244935 A1 | 8/2014 | Ezra et al. | |
| 2014/0280815 A1* | 9/2014 | Candelaria | G06F 13/426 709/223 |
| 2014/0281227 A1* | 9/2014 | Herron | G06F 3/0631 711/117 |
| 2014/0310287 A1* | 10/2014 | Bruso | G06F 9/5011 707/741 |
| 2014/0380014 A1* | 12/2014 | Moyer | G06F 3/0607 711/170 |
| 2015/0242147 A1* | 8/2015 | Sakaguchi | G06F 3/067 711/162 |
| 2015/0355840 A1* | 12/2015 | Carpenter | G06F 3/0632 711/173 |
| 2016/0098225 A1* | 4/2016 | Huang | G06F 11/3442 711/154 |
| 2016/0103764 A1 | 4/2016 | Banerjee et al. | |
| 2016/0246501 A1* | 8/2016 | Krishnamurthy | G06F 3/0644 |
| 2016/0253114 A1* | 9/2016 | Deguchi | G06F 3/0665 711/114 |
| 2017/0177224 A1* | 6/2017 | Glover | G06F 3/0653 |
| 2018/0113640 A1 | 4/2018 | Fernandez et al. | |
| 2018/0267893 A1 | 9/2018 | Barzik et al. | |
| 2018/0300075 A1 | 10/2018 | Fernandez et al. | |
| 2019/0227845 A1 | 7/2019 | Sridhar et al. | |
| 2020/0050769 A1* | 2/2020 | Bhosale | G06F 16/907 |
| 2020/0167092 A1* | 5/2020 | Nakamura | G06F 3/0613 |
| 2021/0081111 A1* | 3/2021 | Larsen | G06F 9/451 |
| 2021/0149576 A1* | 5/2021 | Edwards | G06F 3/067 |
| 2021/0160317 A1* | 5/2021 | Portz | G06F 3/067 |
| 2021/0240369 A1* | 8/2021 | Cain | G06F 3/0604 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006. 1598129, pp. 200-211.
Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots."
U.S. Appl. No. 16/807,709 filed in the name of Avi Puder et al. on Mar. 3, 2020, and entitled "Management of Shared Resources in a Software-Defined Storage Environment."
U.S. Appl. No. 16/822,818 filed in the name of Itay Keller et al. on Mar. 18, 2020, and entitled "Storage System Implementing Snapshot Longevity Ranking for Efficient Management of Snapshots."
U.S. Appl. No. 16/822,848 filed in the name of Itay Keller et al. on Mar. 18, 2020, and entitled "Assignment of Longevity Ranking Values of Storage Volume Snapshots Based on Snapshot Policies."
U.S. Appl. No. 16/823,813 filed in the name of Itay Keller et al. on Mar. 19, 2020, and entitled "Managing Incompressible Data in a Compression-Enabled Log-Structured Array Storage System."
U.S. Appl. No. 16/830,469 filed in the name of Roi Tagar et al. on Mar. 26, 2020, and entitled "Storage Block Balancing Using Volume Part Migration."
U.S. Appl. No. 16/830,473 filed in the name of Yugal Peleg Lieblich et al. on Mar. 26, 2020, and entitled "Replicated State Cluster with Standby Node State Assessment During Leadership Transition."
U.S. Appl. No. 16/830,946 filed in the name of Gil Ben Zeev et al. on Mar. 26, 2020, and entitled "Storage Volume Migration Scheduling Based on Storage vol. Priorities and Specified Constraints."
U.S. Appl. No. 16/832,763 filed in the name of Michal Yarimi et al. on Mar. 27, 2020, and entitled "Managing Storage Device Errors During Processing of Inflight Input/Output Requests."
U.S. Appl. No. 16/834,363 filed in the name of Itay Keller et al. on Mar. 30, 2020, and entitled "Managing Least Recently Used Cache Using Reduced Memory Footprint Sequence Container."
U.S. Appl. No. 16/836,824 filed in the name of Itay Keller et al. on Mar. 31, 2020, and entitled "Management of Volume Snapshots in a Data Storage System."
U.S. Appl. No. 16/888,742 filed in the name of Rivka Matosevich et al. on May 31, 2020, and entitled "Balancing Resiliency and Performance by Selective Use of Degraded Writes and Spare Capacity in Storage Systems."

(56) References Cited

OTHER PUBLICATIONS

U.S. Appl. No. 16/918,654 filed in the name of Rivka Matosevich et al. on Jul. 1, 2020, and entitled "Sharing Memory Resources Between Asynchronous Replication Workloads."
U.S. Appl. No. 16/983,423 filed in the name of Dan Aharoni et al. on Aug. 3, 2020, and entitled "Deferred Reclamation of Invalidated Entries that are Associated with a Transaction Log in a Log-Structured Array."
U.S. Appl. No. 17/024,912 filed in the name of Anurag Sharma et al. on Sep. 18, 2020, and entitled "Automatic Discovery and Configuration of Server Nodes."
U.S. Appl. No. 17/065,754 filed in the name of Dan Aharoni et al. on Oct. 8, 2020, and entitled "Direct Response to IO Request in Storage System with Remote Replication."
U.S. Appl. No. 17/070,073 filed in the name of Dan Aharoni et al. on Oct. 14, 2020, and entitled "Direct Response to IO Request in Storage System Having an Intermediary Target Apparatus."
U.S. Appl. No. 17/070,288 filed in the name of Anurag Sharma et al. on Oct. 14, 2020, and entitled "Pipeline-Based System for Configuration Checking and Reporting Associated with an Information Processing System."
U.S. Appl. No. 17/071,407 filed in the name of John Moran et al. on Oct. 15, 2020, and entitled "Dynamic Remediation Actions in Response to Configuration Checks in an Information Processing System."

* cited by examiner

VOLUME TIERING IN STORAGE SYSTEMS

FIELD

The field relates generally to information processing, and more particularly to storage in information processing systems.

BACKGROUND

Various types of storage systems, including storage systems implementing software-defined storage (SDS) solutions, may be configured to run workloads from multiple different end-users or applications. Different end-users or applications may have different performance and feature requirements for their associated workloads. In some workloads, performance may be most important. In other workloads, capacity utilization or other features requirements may be most important. There is thus a need for techniques which enable a storage system to offer flexibility in storage offerings for workloads with different performance and feature requirements.

SUMMARY

Illustrative embodiments of the present invention provide techniques for volume tiering in storage systems, whereby volume tiers that enable and disable different storage features of a storage system are selected for and associated with storage volumes created in the storage system.

In one embodiment, an apparatus comprises at least one processing device comprising a processor coupled to a memory. The at least one processing device is configured to perform the steps of receiving a request to create a given storage volume in a storage system, the storage system providing a plurality of storage features, and selecting, for the given storage volume, one of a set of one or more volume tiers, each of the volume tiers specifying whether respective ones of the plurality of storage features provided by the storage system are enabled or disabled for storage volumes associated with that volume tier. The at least one processing device is also configured to perform the steps of creating the given storage volume in the storage system, and associating the selected volume tier with the given storage volume, wherein associating the selected volume tier with the given storage volume comprises enabling or disabling respective ones of the plurality of storage features provided by the storage system as specified by the selected volume tier.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous different types of enterprise computing and storage systems are also encompassed by the term "information processing system" as that term is broadly used herein.

Figure 1A:
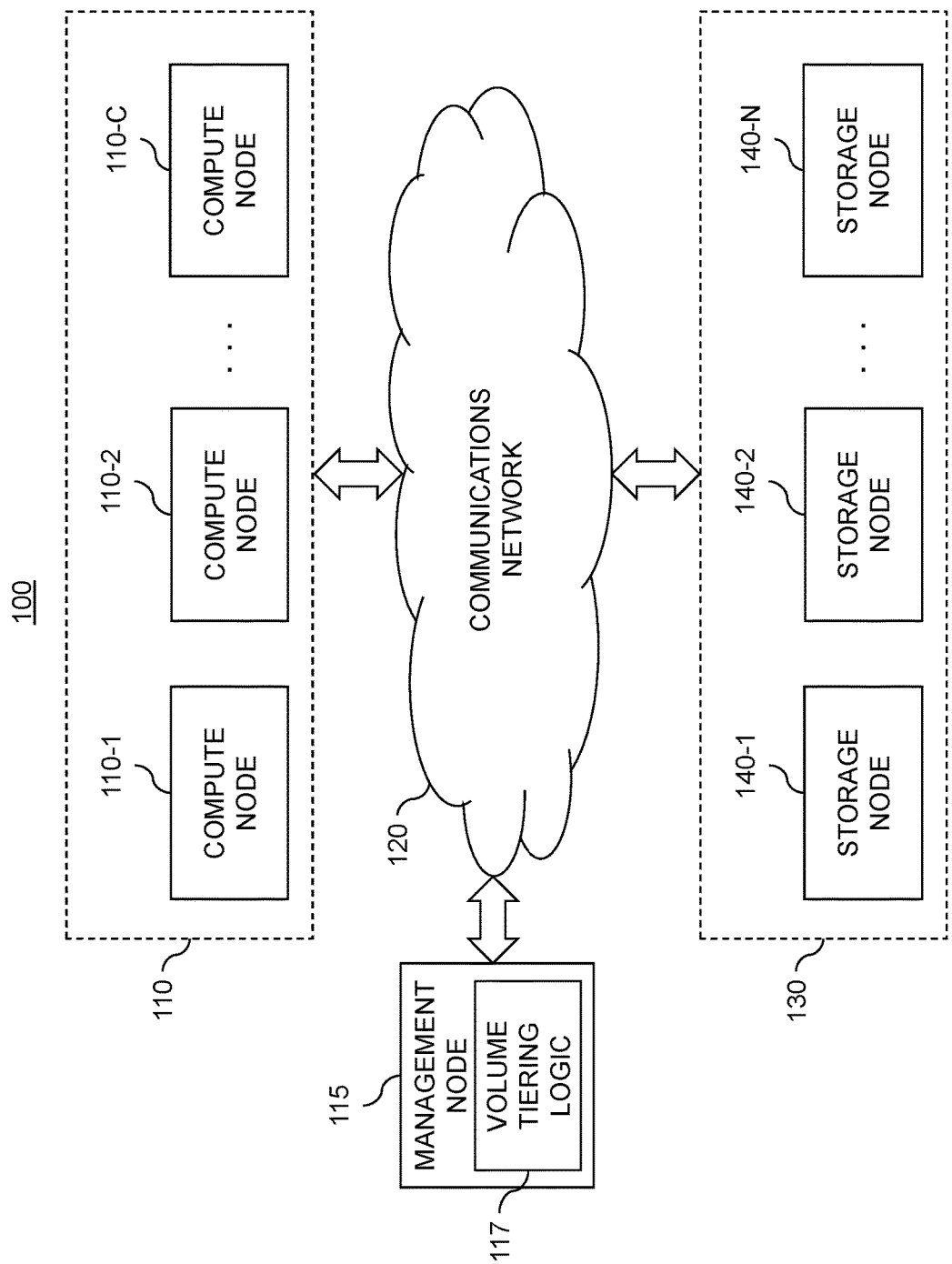
FIGS. 1A and 1B schematically illustrate an information processing system comprising a storage system according to an embodiment of the disclosure.
Figure 1B:
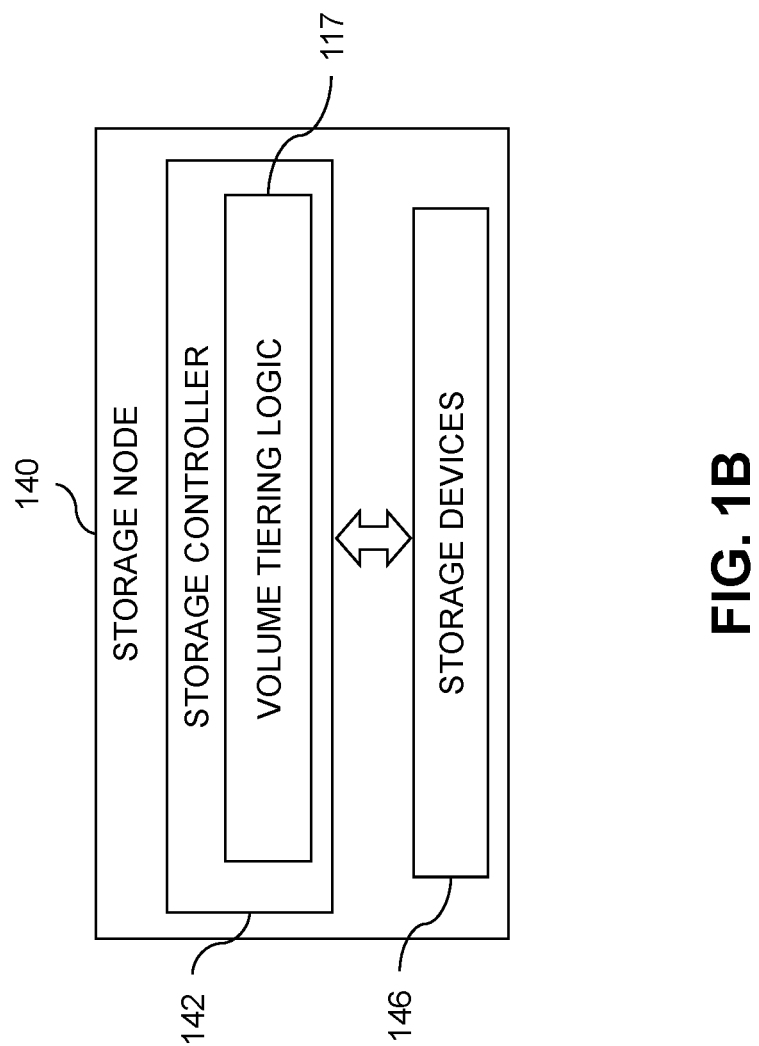

FIGS. 1A and 1B schematically illustrate an information processing system which is configured to enable volume tiering according to an exemplary embodiment of the disclosure. More specifically, FIG. 1A schematically illustrates an information processing system 100 which comprises a plurality of compute nodes 110-1, 110-2, . . . , 110-C (collectively referred to as compute nodes 110, or each singularly referred to as a compute node 110), one or more management nodes 115 (which support a management layer of the system 100), a communications network 120, and a data storage system 130 (which supports a data storage layer of the system 100). The data storage system 130 comprises a plurality of storage nodes 140-1, 140-2, . . . , 140-N (collectively referred to as storage nodes 140, or each singularly referred to as a storage node 140). In the context of the exemplary embodiments described herein, the management nodes 115 and the data storage system 130 implement volume tiering logic 117 supporting the use of volume tiering for assigning volume tiers to logical storage volumes as logical storage volumes are created in the data storage system 130. As will be described in further detail below, the volume tier assigned to a given logical storage volume determines the features that the given logical storage volume supports, the performance that end-users will receive from the given logical storage volume, etc. FIG. 1B schematically illustrates an exemplary framework of at least one or more of the storage nodes 140.

In particular, as shown in FIG. 1B, the storage node 140 comprises a storage controller 142 and a plurality of storage devices 146. In general, the storage controller 142 implements data storage and management methods that are configured to divide the storage capacity of the storage devices 146 into storage pools and logical volumes. Storage controller 142 is further configured to implement volume tiering logic 117 in accordance with the disclosed embodiments, as will be described in further detail below. Various other examples are possible. It is to be noted that the storage controller 142 may include additional modules and other components typically found in conventional implementations of storage controllers and storage systems, although such additional modules and other components are omitted for clarity and simplicity of illustration.

In the embodiment of FIGS. 1A and 1B, the volume tiering logic 117 may be implemented at least in part within the one or more management nodes 115 as well as in one or more of the storage nodes 140 of the data storage system 130. This may include implementing different portions of the volume tiering logic 117 functionality described herein being implemented within the management nodes 115 and the storage nodes 140. For example, in some embodiments the management nodes 115 implement functionality of the volume tiering logic 117 related to defining volume tiers, while the storage nodes 140 of the data storage system 130 implement functionality of the volume tiering logic 117 for assigning different volume tiers to different logical storage volumes that are created using storage resources of the storage devices 146 provided by the storage nodes 140. In other embodiments, however, the volume tiering logic 117 may be implemented entirely within the management nodes 115 or entirely within the storage nodes 140. In still other embodiments, at least a portion of the functionality of the volume tiering logic 117 is implemented in one or more of the compute nodes 110.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (IO) requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The data storage devices 146 are connected to the storage node 140 through any suitable host interface, e.g., a host bus adapter, using suitable protocols such as ATA, SATA, eSATA, NVMe, NVMeOF, SCSI, SAS, etc. In other embodiments, the storage node 140 can be network connected to one or more NAS nodes over a local area network.

The storage controller 142 is configured to manage the storage devices 146 and control IO access to the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage IO requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node 140, and is configured to respond to data IO requests from the compute nodes 110 by accessing the storage devices 146 to store/retrieve data to/from the storage devices 146 based on the IO requests.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage. Each instance of the storage controller 142 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage controllers 142. In particular, the SDCs run on the same servers as the compute nodes 110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs its own routing independent from any other SDC. This implementation prevents unnecessary network traffic and redundant SDS resource usage. Each SDC maintains peer-to-peer connections to every SDS storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, various modules of the storage controller 142 of FIG. 1B collectively provide data storage and management methods that are configured to perform various function as follows. In particular, a storage virtualization and management services module may implement any suitable logical volume management (LVM) system which is configured to create and manage local storage volumes by aggregating the local storage devices 146 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 146 are configured as block storage devices where raw volumes of storage are created and each block can be controlled as, e.g., an individual disk drive by the storage controller 142. Each block can be individually formatted with a same or different file system as required for the given data storage system application.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module implements methods to support various data storage management services such as data protection, data migration, data deduplication, replication, thin provisioning, snapshots, data backups, etc.

Storage systems, such as the data storage system 130 of system 100, may be required to provide both high performance and a rich set of advanced data service features for end-users thereof (e.g., users operating computing nodes 110, applications running on computing nodes 110). Performance may refer to latency, or other metrics such as input output operations per second (TOPS), bandwidth, etc. Advanced data services features may refer to data service features of storage systems including, but not limited to, services for data resiliency, thin provisioning, data reduction, space efficient snapshots, etc. Fulfilling both performance and advanced data service feature requirements can represent a significant design challenge for storage systems. This may be due to different advanced data service features consuming significant resources and processing time. Such challenges may be even greater in software-defined storage systems in which custom hardware is not available for boosting performance.

Different workloads may have different priorities relating to performance and usage of different data services. For example, performance may be most important for some workloads, while capacity utilization or the speed of snapshot creation may be most important for other workloads. Different storage systems may thus be targeted to different particular balance points of performance versus data services. It is thus advantageous to support a variety of balance points in a single storage system, so that the storage system can be used for a wide range of workloads with different requirements. Illustrative embodiments provide techniques for offering such different balance points within a single storage system. Such techniques have various use cases, including in providing flexibility for end-users running multiple applications each with its own, possibly different requirements for performance and data services. Another illustrative use case relates to storage systems that are used below a storage virtualization layer. Since the storage virtualization layer typically contains all the data services it needs, any or most of the data services provided by the storage system are redundant overhead.

Device tiering may be used in some storage systems, such as in storage systems that contain some relatively "fast" and expensive storage devices and some relatively "slow" and less expensive storage devices. In device tiering, the "fast" devices may be used when performance is the primary requirement, where the "slow" and less expensive devices may be used when capacity is the primary requirement. Such device tiering may also use cloud storage as the "slow" device tier. Some storage systems may also or alternately separate devices offering the same performance level to gain performance isolation between different sets of storage volumes. For example, the storage systems may separate the "fast" devices into different groups to gain performance isolation between storage volumes on such different groups of the "fast" devices.

Storage systems may also provide functionality for disabling data reduction features, at the storage pool level or at the storage volume level. For example, when performance is key data reduction may be disabled. Some storage systems also allow a user to create both thin and thick storage volumes, thereby enabling and disabling thin provisioning. Again, this may be at the storage pool level or at the storage volume level. When the thin/thick selection is performed at the storage volume level, this may be viewed as providing single parameter tiering.

Illustrative embodiments provide functionality for implementing storage volume tiering in storage systems. Data storage system 130, as an example, may be configured to support two or more different storage volume tiers, or an arrangement with a single storage volume tier that enables all features, and particular storage volume tiers may be selected and associated with storage volumes or storage pools when they are created in the storage nodes 140 of the data storage system 130. The assignment of a storage volume tier to a particular storage volume may be performed by manual selection or request by an end-user or application, automatically through analysis of characteristics of an end-user or application, etc. The volume tier assigned to a given storage volume determines the features that the given storage volume supports, as well as the performance provided by the given storage volume (e.g., performance levels that an end-user, application, or more generally a compute node such as one of compute nodes 110 in system 100 will receive from the given storage volume).

The volume tiering logic 117 illustratively provides functionality for designing a modular storage stack that allows for skipping certain features or data services (e.g., space efficient snapshots and copies, thin provisioning, data reduction, compute balancing, etc.). The volume tiering logic 117 further provides functionality for defining different volume tiers that may be selected for assignment to different storage volumes. Such selection, as discussed above, may be performed by an end-user or application on compute nodes 110, via automated analysis of the end-user or application (e.g., to determine the needs of that end-user or application for a particular storage volume, such as weights to apply to performance versus data services, weights for different ones of a set of available data services offered by the storage node 140 providing a given storage volume, etc.).

Figure 2:
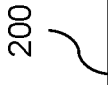
FIG. 2 shows a table illustrating configuration of volume tiers according to an embodiment of the disclosure.

FIG. 2 shows a table 200 with columns for three volume tiers—a direct volume tier, a balanced volume tier and a fully featured volume tier, and rows for different performance and data service features and entries indicating which of the volume tiers have the different performance and data service features enabled and disabled. In the table 200, the performance and data service features include compute balancing, write cache, space efficient snapshots and copies, thin provisioning, data reduction, and resilience/RAID. In the FIG. 2 example, the fully featured volume tier enables all of the performance and data service features, while the balanced volume tier spreads an end user workload out within a storage system to achieve balanced utilization of compute resources. The balanced volume tier also uses a write cache to provide fast acknowledgements. The direct volume tier disables all features with the exception of resiliency features. For the direct volume tier, processing is performed on the storage node that receives an IO instead of spending communication resources to achieve load balancing of IOs across multiple storage nodes.

It should be appreciated that the specific performance and data service features shown in table 200 of FIG. 2 are presented by way of example only and that embodiments are not limited to use with these specific performance and data service features. In other embodiments, various other performance and data service features may be used in addition to, or in place of, one or more of the performance data service features shown in table 200 of FIG. 2. It should be further appreciated that embodiments are not limited solely to the specific example volume tiers shown in table 200 of FIG. 2. In other embodiments, more or fewer than three volume tiers may be defined with different possible combinations of the performance and data service features enabled and disabled.

The volume tiering logic 117 further provides functionality for selecting the most appropriate storage devices to use (e.g., using device tiering as described above) for a particular volume tier based on the properties of that volume tier. The volume tiering logic 117 enables the compute nodes 110 (e.g., end-users thereof, applications running thereon) or the storage nodes 140 to select a volume tier to be used when creating a new storage volume. A default volume tier may be defined in the data storage system 130 (e.g., a default volume tier for the storage system as a whole, default volume tiers per storage pool within a storage system, etc.). In some embodiments, snapshots may inherit the volume tier of the source storage volume. In other embodiments, a new volume tier may be selected when a snapshot operation is performed. Quality of Service (QoS) settings may be applied automatically to storage volumes using the assigned volume tier.

Advantageously, use of volume tiers provides end-users with multiple feature-versus-performance balance points. At the volume level, solutions may be used to selectively enable or disable certain features. To be usable, however, the number of features that a user can individually control may be very limited. Volume tiering, however, can be used to enable and disable a large set of storage features provided by a storage system. Volume tiering also enables the manipulation of software features (e.g., data service features), in contrast with device tiering which manipulates only storage devices. Volume tiering also provides benefits relative to compute balancing approaches, where not all properties can be selectively enabled or disabled. Because volume tiering can selectively enable or disable many more features than other approaches, volume tiering is more suitable than other approaches for running below storage virtualization or below a software defined storage system. Volume tiering also avoids pitfalls when dependencies exist between features (e.g., feature B must be enabled for feature A to work, etc.).

An exemplary process for volume tiering in a storage system will now be described in more detail with reference to the flow diagram of FIG. 3. It is to be understood that this particular process is only an example, and that additional or alternative processes for volume tiering in a storage system may be used in other embodiments.

In this embodiment, the process includes steps 300 through 306. These steps are assumed to be performed using the volume tiering logic 117, which as noted above may be implemented in the management nodes 115 of system 100, in storage nodes 140 of the data storage system 130 of system 100, in compute nodes 110 of system 100, combinations thereof, etc. The process begins with step 300, receiving a request to create a given storage volume in the data storage system 130, the data storage system 130 providing a plurality of storage features. The request may be received from one of the compute nodes 110, an application running on one or more of the compute nodes 110, etc. In step 302, one of a set of one or more volume tiers are selected for the given storage volume. Each of the volume tiers specifies whether respective ones of the plurality of storage features provided by the storage system are enabled or disabled for storage volumes associated with that volume tier. The FIG. 3 process, in some embodiments, includes defining or designing the set of one or more volume tiers. Defining or designing the set of one or more volume tiers may comprise optimizing respective ones of the set of one or more volume tiers for designated types of workloads or workflows that may be executed on the storage system. Such optimization may include specifying particular subsets of the plurality of storage features which are enabled and disabled within a given volume tier based on characteristics of a particular type of workload.

The plurality of storage features may comprise one or more performance features (e.g., access to a write cache, access to compute balancing across the storage nodes 140 of the data storage system 130, etc.) and one or more data service features (e.g., a snapshotting and copy service having a speed defined by an associated service level agreement, a thin provisioning service, at least one of a data reduction and a data deduplication service, at least one data resiliency service such as redundant array of independent drives (RAID) functionality, etc.).

The set of one or more volume tiers may comprise tiers which enable and disable different ones or types of the features. For example, a first volume tier may by a fully featured volume tier specifying that all of the plurality of features are enabled (e.g., that the one or more performance features are enabled and that the one or more data service features are enabled). A second volume tier may be a storage virtualization volume tier specifying that the one or more performance features are enabled and that the one or more data service features are disabled (e.g., as when a storage system is used below a storage virtualization layer, the storage virtualization layer may itself provide the data services it needs such that any data services provided by the storage system are redundant overhead). A third volume tier may specify that at least one of the one or more performance features is enabled, that at least one of the one or more data service features is enabled, and that at least one of the one or more data service features is disabled. For example, the third volume tier may be a balanced volume tier that provides access to compute balancing and a write cache, as well as data resiliency services such as RAID. The balanced volume tier, however, may have other data service features such as space efficient snapshots and copies, thin provisioning, and data reduction disabled. Still other volume tiers may provide different combinations of the performance and data service features enabled and disabled. As another example, a direct volume tier may disable all data service features with the exception of data resiliency (e.g., RAID features), where the direct volume tier may also perform all processing on storage nodes 140 that receive IO requests instead of spending communication resources to perform compute balancing or provide access to a write cache.

Step 302 may comprise receiving the selection of the volume tier via one of the computing nodes 110 that provides a workload for execution on the given storage volume. The selection of the volume tier in step 302 may be further or alternatively based at least in part on one or more characteristics of a workload to be executed on the given storage volume. Selecting the volume tier for the given storage volume in step 302 may include determining whether the given storage volume is a snapshot of another storage volume of the storage system, and selecting the volume tier for the given storage volume based at least in part on the volume tier selected for the other storage volume. In some embodiments, the given storage volume may be assigned the same volume tier as the other storage volume. In other embodiments, a new volume tier is selected based on the volume tier assigned or selected for the other storage volume. For example, if the other storage volume is assigned a first volume tier, the given storage volume which is a snapshot of the other storage volume may be assigned a second volume tier that provides less features than the first volume tier. In the context of FIG. 3, if the other storage volume is assigned a balanced volume tier, the given storage volume would not be assigned the fully featured volume tier. In other words, the snapshot volume would not be assigned a volume tier providing more features than a source volume from which the snapshot volume is taken. Various other examples are possible.

In some embodiments, the given storage volume provides at least a portion of at least one of a software defined storage system and a storage virtualization layer of the data storage system 130. In such embodiments, the selected volume tier for the given storage volume specifies that ones of the plurality of features providing data services are disabled (e.g., as when a storage system is used below a storage virtualization layer, the storage virtualization layer may itself provide the data services it needs such that any data services provided by the storage system are redundant overhead).

Figure 3:
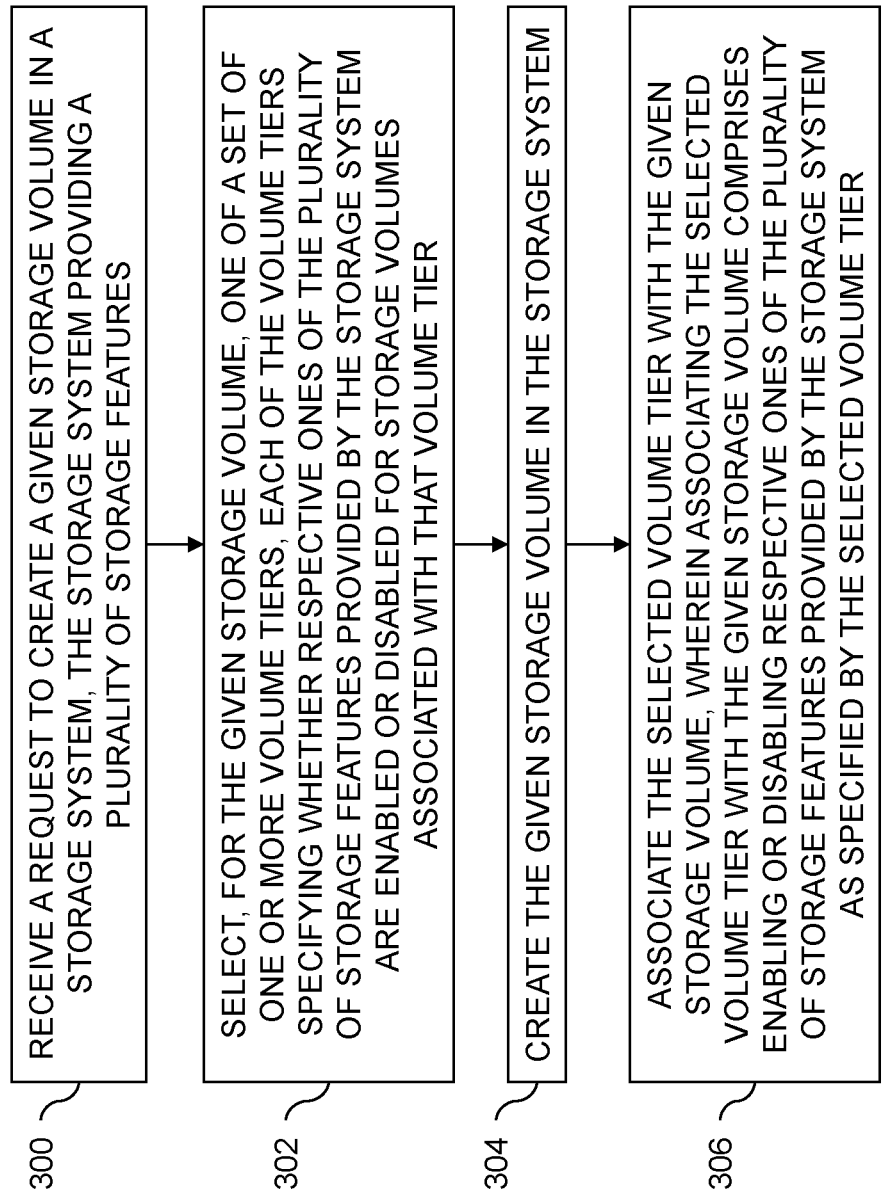
FIG. 3 is a flow diagram of an exemplary process for volume tiering in a storage system according to an embodiment of the disclosure.

The FIG. 3 process continues with step 304, creating the given storage volume in the data storage system. In step 306, the selected volume tier from step 302 is associated with the given storage volume. Associating the selected volume tier with the given storage volume in step 306 comprises enabling or disabling respective ones of the plurality of storage features provided by the storage system as specified by the selected volume tier. Step 304 may include selecting one or more designated types of storage resources provided by one or more designated types of storage devices in the storage system based at least in part on the subset of the plurality of features specified by the selected volume tier. Associating the selected volume tier with the given storage volume in step 306 may comprise utilizing a modular storage stack provided by the storage system which permits data service features of the storage system to be selectively skipped. Associating the selected volume tier with the given storage volume in step 306 may also or alternatively comprise applying one or more quality of service settings to the given storage volume based at least in part on the selected volume tier.

The particular processing operations and other system functionality described in conjunction with the flow diagram of FIG. 3 are presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 4:
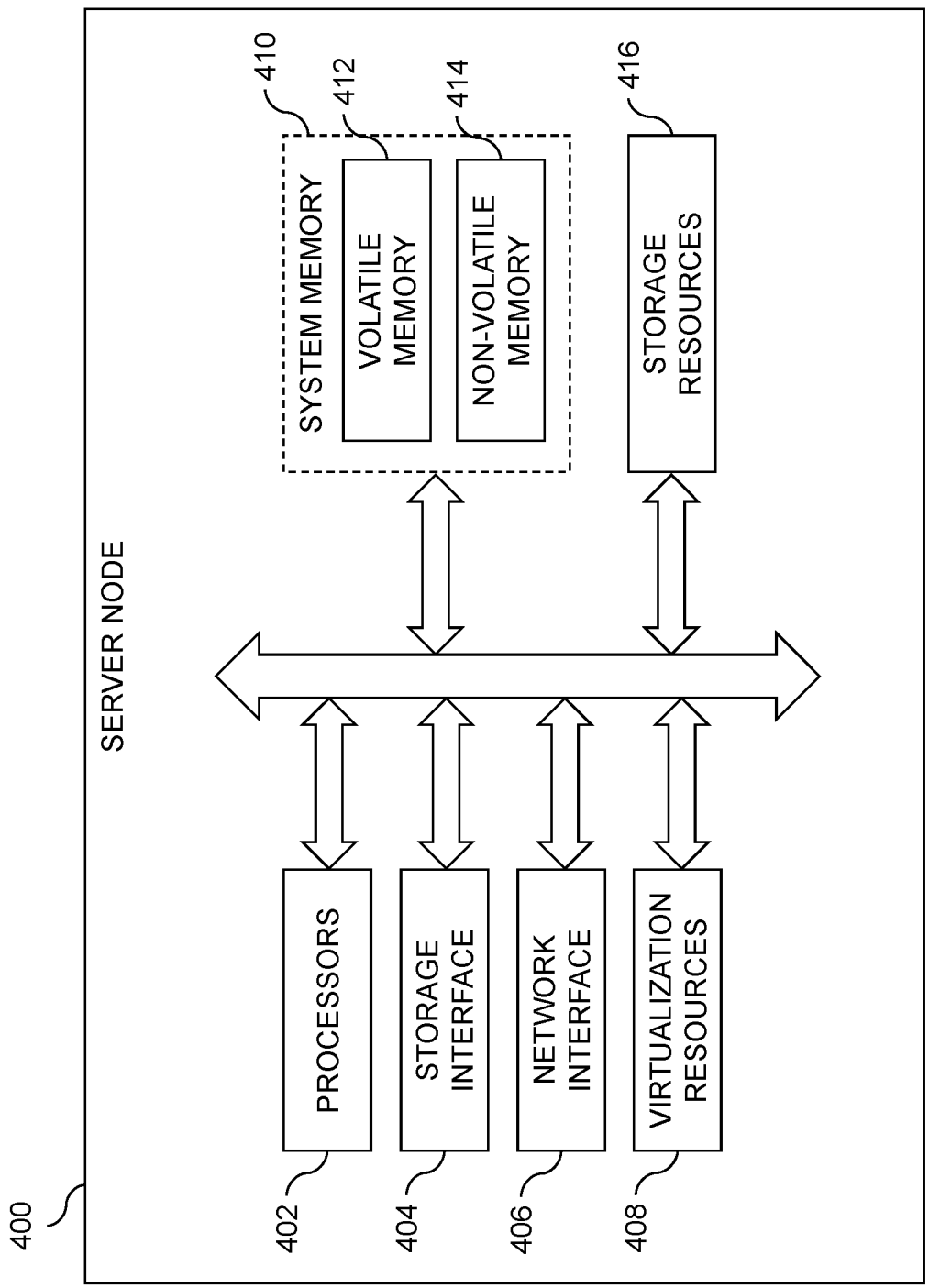
FIG. 4 schematically illustrates a framework of a server node for implementing a storage node which hosts logic for volume tiering according to an exemplary embodiment of the disclosure.

FIG. 4 schematically illustrates a framework of a server node (or more generally, a computing node) for hosting volume tiering logic according to an exemplary embodiment of the disclosure. The server node 400 comprises processors 402, storage interface circuitry 404, network interface circuitry 406, virtualization resources 408, system memory 410, and storage resources 416. The system memory 410 comprises volatile memory 412 and non-volatile memory 414. The processors 402 comprise one or more types of hardware processors that are configured to process program instructions and data to execute a native operating system (OS) and applications that run on the server node 400.

For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 408 can be instantiated to execute one or more service or functions which are hosted by the server node 400. For example, the virtualization resources 408 can be configured to implement the various modules and functionalities of the volume tiering logic as discussed herein. In one embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine"

generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete file system, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., the volume tiering logic 117, comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of NAND Flash storage devices, SSD devices, or other types of next generation non-volatile memory (NGNVM) devices. The system memory 410 can be implemented using a hierarchical memory tier structure wherein the volatile system memory 412 is configured as the highest-level memory tier, and the non-volatile system memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving a request to create a given storage volume in a storage system, the given storage volume to be created as part of at least one of a software defined storage system and a storage virtualization layer of the storage system, the storage system providing a first set of storage features separate from a second set of storage features provided by said at least one of the software defined storage system and the storage virtualization layer of the storage system;
selecting, for the given storage volume, one of a set of one or more volume tiers, each of the volume tiers specifying whether respective ones of the first set of storage features provided by the storage system are enabled or disabled for storage volumes associated with that volume tier based at least in part on the second set of software features provided by said at least one of the software defined storage system and the storage virtualization layer of the storage system;
creating the given storage volume in the storage system; and
associating the selected volume tier with the given storage volume, wherein associating the selected volume tier with the given storage volume comprises enabling or disabling respective ones of the first set of storage features provided by the storage system as specified by the selected volume tier;

wherein the selected volume tier specifies whether respective ones of the first set of storage features provided by the storage system are enabled or disabled for storage volumes associated with that volume tier based at least in part on at least one of (i) dependencies between one or more of the second set of storage features and one or more of the first set of storage features and (ii) redundancies between one or more of the second set of storage features and one or more of the first set of storage features.

2. The apparatus of claim 1 wherein the first set of storage features comprises one or more performance features and one or more data service features.

3. The apparatus of claim 2 wherein the one or more performance features comprise at least one of:
   access to a write cache; and
   access to compute balancing across two or more storage nodes of the storage system.

4. The apparatus of claim 2 wherein the one or more data service features comprise at least one of:
   a snapshotting and copy service having a speed defined by an associated service level agreement;
   a thin provisioning service;
   at least one of a data reduction and data deduplication service; and
   at least one data resiliency service.

5. The apparatus of claim 2 wherein the set of one or more volume tiers comprises:
   a first volume tier specifying that the one or more performance features are enabled and that the one or more data service features are enabled;
   a second volume tier specifying that the one or more performance features are enabled and that the one or more data service features are disabled; and
   at least a third volume tier specifying that at least one of the one or more performance features is enabled, that at least one of the one or more data service features is enabled, and that at least one of the one or more data service features is disabled.

6. The apparatus of claim 1 wherein selecting the volume tier for the given storage volume comprises receiving the selection of the volume tier via a computing node providing a workload for execution on the given storage volume.

7. The apparatus of claim 1 wherein selecting the volume tier for the given storage volume is based at least in part on one or more characteristics of a workload to be executed on the given storage volume.

8. The apparatus of claim 1 wherein selecting the volume tier for the given storage volume comprises:
   determining whether the given storage volume is a snapshot of another storage volume of the storage system; and
   selecting the volume tier for the given storage volume based at least in part on the volume tier selected for the other storage volume.

9. The apparatus of claim 1 wherein the selected volume tier specifies that ones of the first set of storage features providing data services are disabled.

10. The apparatus of claim 1 wherein creating the given storage volume in the storage system comprises selecting one or more designated types of storage resources provided by one or more designated types of storage devices in the storage system based at least in part on the subset of the plurality of features specified by the selected volume tier.

11. The apparatus of claim 1 wherein associating the selected volume tier with the given storage volume comprises utilizing a modular storage stack provided by the storage system which permits one of the first set of storage features providing data service features of the storage system to be selectively skipped.

12. The apparatus of claim 1 wherein associating the selected volume tier with the given storage volume comprises applying one or more quality of service settings to the given storage volume based at least in part on the selected volume tier.

13. The apparatus of claim 1 wherein the at least one processing device is further configured to perform the step of defining the set of one or more volume tiers.

14. The apparatus of claim 13 wherein defining the set of one or more volume tiers comprises optimizing respective ones of the set of one or more volume tiers for designated types of workloads.

15. The apparatus of claim 1 wherein the at least one processing device comprises a storage controller of the storage system.

16. The apparatus of claim 1 wherein the first and second sets of storage features comprise software features.

17. The apparatus of claim 1 wherein the selected volume tier specifies that a subset of the first set of storage features providing data service features which are redundant to data service features in the second set of storage features are disabled.

18. A computer program product comprising a non-transitory processor-readable storage medium having stored therein program code of one or more software programs, wherein the program code when executed by at least one processing device causes the at least one processing device to perform steps of:
   receiving a request to create a given storage volume in a storage system, the given storage volume to be created as part of at least one of a software defined storage system and a storage virtualization layer of the storage system, the storage system providing a first set of storage features separate from a second set of storage features provided by said at least one of the software defined storage system and the storage virtualization layer of the storage system;
   selecting, for the given storage volume, one of a set of one or more volume tiers, each of the volume tiers specifying whether respective ones of the first set of storage features provided by the storage system are enabled or disabled for storage volumes associated with that volume tier based at least in part on the second set of software features provided by said at least one of the software defined storage system and the storage virtualization layer of the storage system;
   creating the given storage volume in the storage system; and
   associating the selected volume tier with the given storage volume, wherein associating the selected volume tier with the given storage volume comprises enabling or disabling respective ones of the first set of storage features provided by the storage system as specified by the selected volume tier;
   wherein the selected volume tier specifies whether respective ones of the first set of storage features provided by the storage system are enabled or disabled for storage volumes associated with that volume tier based at least in part on at least one of (i) dependencies between one or more of the second set of storage features and one or more of the first set of storage features and (ii) redundancies between one or more of the second set of storage features and one or more of the first set of storage features.

19. A method comprising steps of:

receiving a request to create a given storage volume in a storage system, the given storage volume to be created as part of at least one of a software defined storage system and a storage virtualization layer of the storage system, the storage system providing a first set of storage features separate from a second set of storage features provided by said at least one of the software defined storage system and the storage virtualization layer of the storage system;

selecting, for the given storage volume, one of a set of one or more volume tiers, each of the volume tiers specifying whether respective ones of the first set of storage features provided by the storage system are enabled or disabled for storage volumes associated with that volume tier based at least in part on the second set of software features provided by said at least one of the software defined storage system and the storage virtualization layer of the storage system;

creating the given storage volume in the storage system; and associating the selected volume tier with the given storage volume, wherein associating the selected volume tier with the given storage volume comprises enabling or disabling respective ones of the first set of storage features provided by the storage system as specified by the selected volume tier;

wherein the selected volume tier specifies whether respective ones of the first set of storage features provided by the storage system are enabled or disabled for storage volumes associated with that volume tier based at least in part on at least one of (i) dependencies between one or more of the second set of storage features and one or more of the first set of storage features and (ii) redundancies between one or more of the second set of storage features and one or more of the first set of storage features; and wherein the method is performed by at least one processing device comprising a processor coupled to a memory.

20. The method of claim 19 wherein the first and second sets of storage features comprise software features.

* * * * *